Aug. 29, 1961 G. P. TROGDON 2,997,982
ANIMAL RESTRAINING GATE
Filed Oct. 28, 1959 2 Sheets-Sheet 2
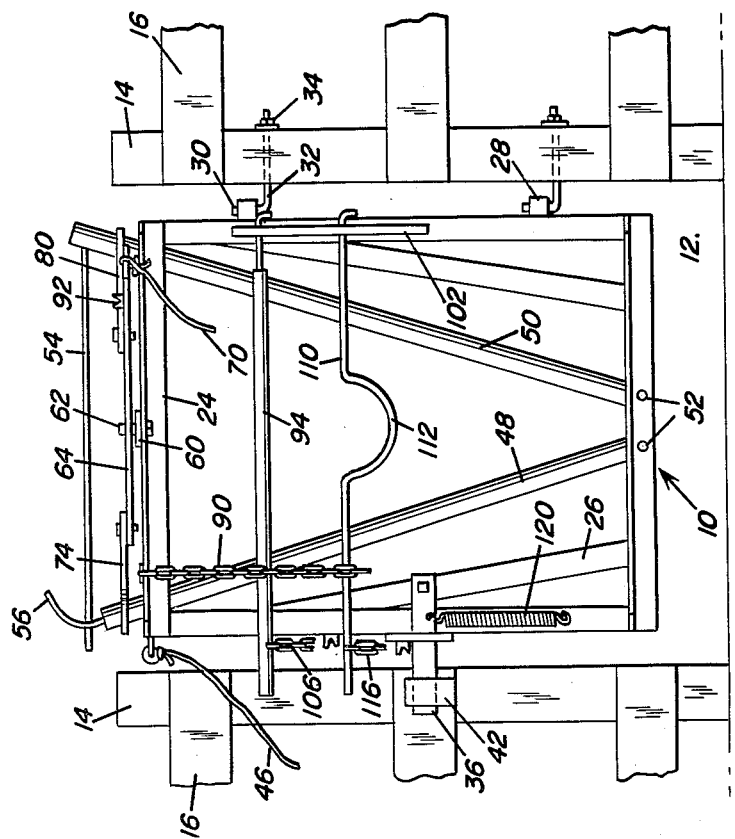
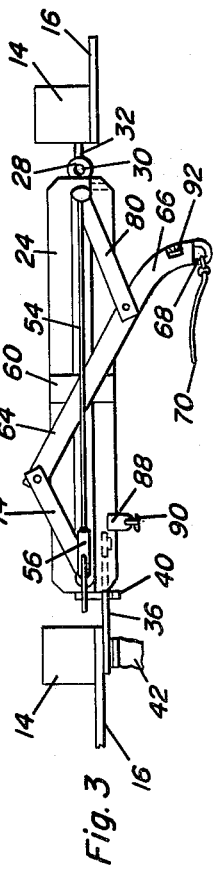
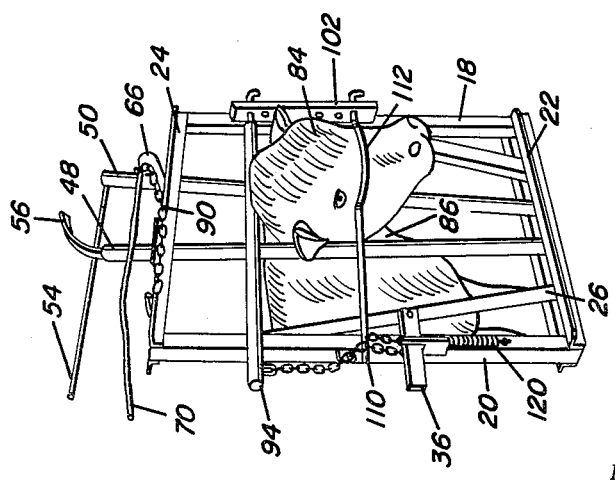
George P. Trogdon
INVENTOR.

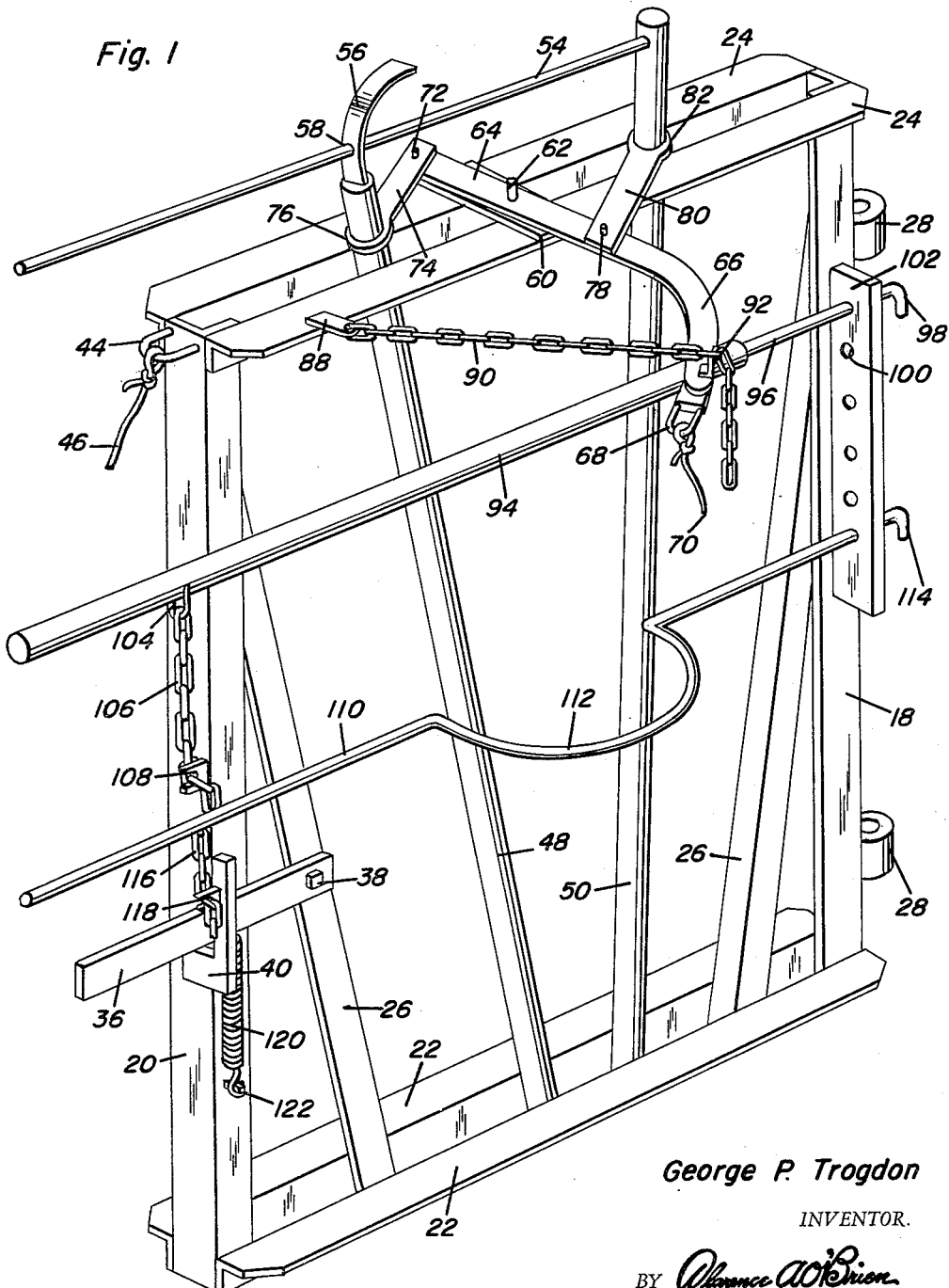

United States Patent Office 2,997,982
Patented Aug. 29, 1961

---

2,997,982
ANIMAL RESTRAINING GATE
George P. Trogdon, Rte. 2, Anadarko, Okla.
Filed Oct. 28, 1959, Ser. No. 849,281
5 Claims. (Cl. 119—98)

The present invention generally relates to a gate structure and more particularly to a gate structure which has incorporated into it a construction for receiving and retaining the head of an animal in such a manner that the head of the animal is substantially immovable thereby enabling access to be had to the head of the animal without any danger to the person having access to the animal's head.

In many operations dealing with animals, it is desirable that the animal be restrained. For example, when dehorning cattle or branding cattle and other animals, it is quite often desirable that the animals be held relatively stationary in order that the operation may be performed expeditiously and in order that the person performing the operation will not be endangered due to the animal's tendency to attack a person molesting it.

Accordingly, it is the primary object of the present invention to provide an animal restraining gate which may be mounted in any desired position such as in an entranceway to an enclosure such as a barn or pen and which requires only a single person to operate the gate with the gate being operable from a remote position thereby enabling the animal to be captured by the present invention without the person operating the gate being in the immediate vicinity thereby permitting such a person to cause the animal to place its head in the gate after which the gate may be closed into a restraining position.

Yet another feature of the present invention is to provide an animal restraining gate which is extremely simple in construction, adjustable for receiving heads of various sizes and shapes, long lasting and dependable and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the gate of the present invention illustrating the structural details thereof;

FIGURE 2 is a front view on a reduced scale of the gate showing further structural details thereof;

FIGURE 3 is a top view on a further reduced scale of the gate; and

FIGURE 4 is a perspective view on a still further reduced scale of the gate illustrating it in closed position.

Referring now specifically to the drawings, the numeral 10 generally designates the gate construction of the present invention which is shown as being mounted in an opening or passageway 12 defined by a pair of upright fence posts 14 with boards or other fencing elements 16 extending outwardly therefrom. The gate 10 includes vertical angle iron frame members 18 and 20 disposed in spaced parallel relationship with the lower ends of the frame members 18 and 20 being interconnected by a pair of horizontal angle iron members 22 which are spaced from each other and rigidly connected to the vertical frame members 18 and 20 by any suitable means such as welding, bolts or the like. The upper ends of the frame members 18 and 20 are interconnected by a pair of angle iron top frame members 24 parallel to the bottom frame members 22 and spaced in the same manner as the frame members 22, that is, on either side of the vertical frame members 18 and 20. The frame members 24 are rigidly affixed to the frame members 18 and 20 in any suitable manner such as by welding, bolting or the like. A pair of upwardly and outwardly inclined braces 26 are provided which are preferably of angle iron construction and which are extended between the lower frame members 22 and also secured at their upper ends to the respective side frame members 18 and 20 at a point spaced below the upper frame members 24. The brace members 26 may be secured in position by suitable means such as welding or the like. The frame members 18, 20, 22 and 24 and the brace members 26 all cooperate to form a rigid open rectangular framework disposed in a vertical plane with the spaces between the frame members 22 and the frame members 24 forming generally vertically aligned slots.

The vertical frame member 18 is provided with a pair of cylindrical hinge barrels or lugs 28 rigidly secured thereto in vertical alignment for receiving the upturned ends 30 of an L-shaped hinge member which has the horizontal leg 32 thereof extending through the post 14 and secured in position by a fastening nut 34. Thus, the gate is suspended or supported from the post 14 for swinging movement in substantially a horizontal plane.

At the opposite edge of the gate, there is provided a pivotally mounted latch bar 36 pivotally supported on the brace 26 by a pivot bolt 38. An L-shaped guide lug 40 is welded to the frame member 20 and guides the vertical swinging movement of the latch bar 36. The latch bar 36 is adapted to engage a keeper 42 secured to the post 14 or to one of the fencing boards 16 whereby the latch bar 36 will engage the keeper 42 and retain the gate in closed position. The latch keeper 42 may be of L-shaped configuration or preferably will have an inclined cam surface so that when the gate is swung toward the closed position, the lower edge of the latch bar 36 will engage the upwardly facing inclined cam surface and ride up the latch keeper and then drop behind the keeper between the keeper and the fencing board 16. Thus, the gate will automatically latch itself closed when it is moved towards a closed position. The upper end of frame member 20 is provided with a loop 44 to which a pull rope 46 is attached whereby the pull rope 46 may be actuated and the gate swung to a closed position from a point remote from the gate thereby permitting the gate to be closed without the person closing the gate being actually in contacting relation with the gate thus facilitating the closing of the gate by a person having a rope 46 connected to the loop 44 with the rope 46 being as long as desired.

Supported between the lower frame members 22 is a pair of cylindrical stanchion members or bars 48 and 50 which may be in the form of tubular pipes supported by pivot bolts 52 whereby the stanchion members 48 and 50 may swing in a vertical plane about the horizontal pivot bolts 52. The upper ends of the stanchion members 48 and 50 extend through the slot defined by the spaced top frame members 24 whereby the slot will afford a guide for the stanchion members 48 and 50 and will limit the outward and inward swinging movement thereof. The upper end of the stanchion member 50 is provided with an elongated rigid rod 54 connected thereto with the rigid rod 54 extending toward the other stanchion member 48 and passing just above the upper end of the other stanchion member 48. The other stanchion member 48 is provided with an upwardly extending arcuate leaf spring 56 connected to the upper end thereof by any suitable means with the spring 56 having an aperture 58 therein slidably receiving the rod 54 and binding the rod 54 when the spring 56 is released. In other words, the spring 56 is normally arcuate and when the stanchions 48 and 50 are urged together from their position shown in FIGURE 1, the rod 54 will tend to straighten the arcuate spring 56 thus permitting the rod 54 to slide through the aperture 58 with little actual resistance. However, when the stanchions 48 and 50 are pulled apart, the tendency of the rod 54 is to further arcuate the spring '56 thus causing the edges of the opening 58 to bite into or bind on the rod 54 thereby preventing opening movement of the stanchions 48 and 50 until the upper end of the spring 56 is grasped and pulled upwardly or straightened so that the rod 54 may slide back through the opening 58. The flexibility of the rod 54 and the spring 56 is sufficient to accommodate the slight changes in angular relation as would occur during the swinging movement of the stanchions 48 and 50 toward each other.

A mechanism for moving the stanchions 48 and 50 together is provided and this mechanism includes a mounting plate 60 interconnecting the upper frame members 24 at the centers thereof and the mounting plate 60 is provided with an upwardly extending centrally disposed pivot pin 62 rigid therewith. The mounting plate 60 may be fastened in any suitable manner such as by welding or the like. Pivotally supported on the pin 62 is an elongated operating lever 64. The operating lever 64 has one end curved as indicated by the numeral 66 and the curve extends toward the frame member 20 and terminates in a loop 68 having a pull rope 70 attached thereto.

The end of the lever 64 opposite from the curved portion 66 is provided with an upstanding pin 72 pivotally connected to an operating link 74 which has an eye 76 on the free end thereof in encircling relationship to the stanchion 48. The eye 76 may swing in relation to the stanchion 48 but is prevented from substantial vertical movement of the stanchion 48 by virtue of the frame members 24 and by gravity. Adjacent the curved end 66 of the lever 64, an upstanding pin 78 is provided on the lever 64 which engages the outer end of a second operating link 80 which also has an eye or loop 82 on the free end thereof rotatably encircling the stanchion 50. Thus, as the lever 64 is pivoted about pivot pin 62, the stanchions 48 and 50 will be moved toward each other if the rope 70 is pulled toward the frame member 20. Thus, by having an elongated rope 70 attached to the loop 68, the stanchion members 48 and 50 may be moved into a restraining or closed position from a remote point. Thus, a person may have an elongated rope and prod the animal with a suitable instrument such as a stick or pole so that the animal will enter his head between the stanchion members 48 and 50 whereupon the pull rope may be then immediately pulled and the stanchion members 48 and 50 closed against the neck of the animal inwardly of the head. The closed position of the stanchions 48 and 50 is shown in FIGURE 4 in which the head 84 of an animal is restrained by the stanchion members with the stanchion members engaging the neck 86 of the animal.

The top frame member 24 nearest the curved end 66 of the lever 64 is provided with a horizontally extending lug 88 to which is attached an anchoring chain 90 that has the free end thereof adjustably received within a chain hook 92. The chain 90 will serve to limit the opening movement of the stanchion members 48 and 50 and will also serve to lock the stanchion members 48 and 50 when in closed position since the link of the chain 90 received in the chain hook 92 may be adjusted after the stanchion members 48 and 50 are closed thereby providing a positive lock for the stanchion members 48 and 50 if for some reason the friction lock provided by the spring 56 and rod 54 is caused to slip by excessive pressure being exerted on the stanchion members by the animal. Thus, with the structure as so far defined, the animal's head will be restrained from substantial rearward or forward movement although the head can still move somewhat vertically and the animal can still throw the head upwardly by elevating the nose region thereof. In order to limit the vertical movement of the head of the animal, there is provided a transverse bar or rod 94 in the form of an elongated member extending generally horizontally in spaced relation below the top frame members 24. One end of the bar 94 is provided with a reduced longitudinal extension 96 having a laterally extending relatively short angled end portion 98 which is received within one of several apertures 100 in a mounting bracket 102 in the form of a plate extending outwardly from the vertical frame member 18. The other end of the bar 94 is provided with a lug 104 to which is attached a chain 106. The chain 106 is adjustably connected to a chain hook 108 secured to the vertical frame member 20 as by welding whereby the position of the bar 94 may be adjusted with the bar 94 resting against the upper edge of the neck region 86 of the animal. Thus, with this construction, the vertical component of movement of the animal's head is materially restricted and by adjusting the effective length of the chain 106, the animal's head may be restrained in a downwardly extended position thus preventing any substantial vertical movement of the head of the animal.

For preventing lateral and vertical shifting of the nose region of the animal's head, there is provided a nose engaging bar or rod 110 having a U-shaped central portion 112 disposed in alignment with the area between the stanchions 48 and 50. One end of the bar 110 is provided with a relatively short angled end portion 114 which retains the rod 110 extended through one of the lower of the apertures 100 in the mounting plate 102. The other end of the rod 110 is provided with a chain 116 attached thereto and in spaced relation to the free end thereof which chain is received in a chain hook 118 secured to the guide 40. Thus, with this construction, the U-shaped portion 112 of the rod 110 will be continuously resting against the nose portion of the animal to prevent lateral twisting of the animal's head. Also, the U-shaped portion 112 will prevent any substantial vertical swinging movement of the animal's head. Thus, the animal's head will be constrained from movement in substantially every direction thereby rendering th animal's head relatively stationary.

While the latch 36 may be gravity operated, it is preferable to provide a tension coil spring 120 having one end attached to the latch 36 in spaced relation to the pivot bolt 38 and having the other end attached to a projection 122 attached to the vertical frame member 20. Thus, the latch member 36 will be assured of maintaining a latched engagement with the keeper 42 even though the animal may push or pull rather violently on the gate structure.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An animal restraining gate comprising a vertical frame, a pair of vertical stanchion bars operable in the frame and having their lower end portions pivotally secured thereto, said stanchion bars for receiving the neck of an animal therebetween, a horizontally swinging lever pivotally secured, at an intermediate point, on the top portion of the frame between the free end portions of the stanchion bars, links operatively connecting said lever, on opposite sides of its pivot, to the stanchion bars for closing same on the animal's neck, and means for releasably securing the stanchion bars in a closed position.

2. An animal restraining gate comprising a vertical frame, a pair of vertical stanchion bars operable in the frame and having their lower end portions pivotally secured thereto, said stanchion bars for receiving the neck of an animal therebetween, a horizontally swinging lever pivotally secured, at an intermediate point, on the top portion of the frame between the free end portions of the stanchion bars, links operatively connecting said lever, on opposite sides of its pivot, to the stanchion bars for closing same on the animal's neck, and means for releasably securing the stanchion bars in a closed position, said means including an apertured, arcuate leaf spring on the free end portion of one of the stanchion bars, and a rod on the free end portion of the other stanchion bar slidable through said spring and adapted to be frictionally gripped thereby against withdrawal therefrom.

3. An animal restraining gate in accordance with claim 2, together with means for positively securing the stanchion bars in said closed position and for limiting the opening movement thereof, the last-named means comprising a chain having one end portion anchored to the frame and its other end portion adjustably and detachably connected to one end portion of the lever.

4. An animal restraining gate in accordance with claim 2, together with means for retaining the animal's neck against upward movement between the stanchion bars, the last-named means comprising a bracket mounted on one side portion of the frame and having vertically spaced openings therein, a rod engageable transversely on the animal's neck and having one end portion insertable selectively in the openings for adjustably mounting said rod on the bracket, and a flexible member for detachably anchoring the free end of the rod to the other side portion of the frame.

5. An animal restraining gate comprising a vertical frame, a pair of vertical, cylindrical stanchion bars operable on the frame and pivotally connected at their lower ends thereto, said stanchion bars for receiving an animal's neck therebetween, a lever pivotally secured, at an intermediate point to a vertical pin on the top portion of the frame for swinging movement in a horizontal plane between the free end portions of the stanchion bars, links having one end portion pivotally connected to the lever on opposite sides of its pivot, rings on the other ends of said links loosely journaled on the stanchion bars operatively connecting the lever thereto for closing said stanchion bars on the animal's neck, and frictional means releasably securing the stanchion bars in a closed position.

References Cited in the file of this patent

UNITED STATES PATENTS

| | | |
|---|---|---|
| 2,508,549 | Stephenson | May 23, 1950 |
| 2,796,848 | Zimmerman | June 25, 1957 |
| 2,804,046 | Turner | Aug. 27, 1957 |

FOREIGN PATENTS

| | | |
|---|---|---|
| 738,971 | Great Britain | Oct. 26, 1955 |